United States Patent
Park

(10) Patent No.: US 7,176,788 B2
(45) Date of Patent: Feb. 13, 2007

(54) VEHICLE THEFT PREVENTION SYSTEM AND METHOD THEREOF

(75) Inventor: Jong-Rae Park, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 224 days.

(21) Appl. No.: 11/014,775

(22) Filed: Dec. 20, 2004

(65) Prior Publication Data

US 2006/0038664 A1 Feb. 23, 2006

(30) Foreign Application Priority Data

Aug. 17, 2004 (KR) ...................... 10-2004-0064890

(51) Int. Cl.
*B60R 25/10* (2006.01)

(52) U.S. Cl. ............................. 340/426.19; 340/426.1; 340/426.26; 340/825.49; 340/988; 701/213

(58) Field of Classification Search ........... 340/426.19, 340/426.13, 426.1, 425.5, 426.26, 825.49, 340/988, 825.36, 539.1, 539.13; 701/213; 307/10.2, 10.3
See application file for complete search history.

(56) References Cited

U.S. PATENT DOCUMENTS

| | | | | |
|---|---|---|---|---|
| 5,796,178 A | * | 8/1998 | Onuma | ...................... 307/10.2 |
| 6,356,841 B1 | * | 3/2002 | Hamrick et al. | ............. 701/213 |
| 6,522,265 B1 | * | 2/2003 | Hillman et al. | .............. 340/988 |
| 6,809,659 B2 | * | 10/2004 | Flick et al. | .................. 340/989 |
| 6,831,597 B2 | * | 12/2004 | Sasaki et al. | ........... 342/357.07 |
| 6,882,274 B2 | * | 4/2005 | Richardson et al. | ... 340/539.13 |

* cited by examiner

*Primary Examiner*—Davetta W. Goins
(74) *Attorney, Agent, or Firm*—Greenblum & Bernstein, P.L.C.

(57) ABSTRACT

A vehicle theft prevention system and a method thereof. The system includes an Electronic Control Unit and a vehicle information terminal. The ECU is mounted with a controller that generates a vehicle motion detection message by receiving abnormal detection signals from various sensors detecting the orientation and location of the vehicle and outputs the message through a Control Area Network communication interface. A vehicle information terminal includes a Central Processing Unit, constant voltage circuit part, and CAN communication interface. The CPU is equipped with a Global Positioning System module and mobile communication module. The system thus constructed executes a vehicle motion informing function to prevent vehicle theft even when the vehicle ignition key is turned off.

4 Claims, 2 Drawing Sheets

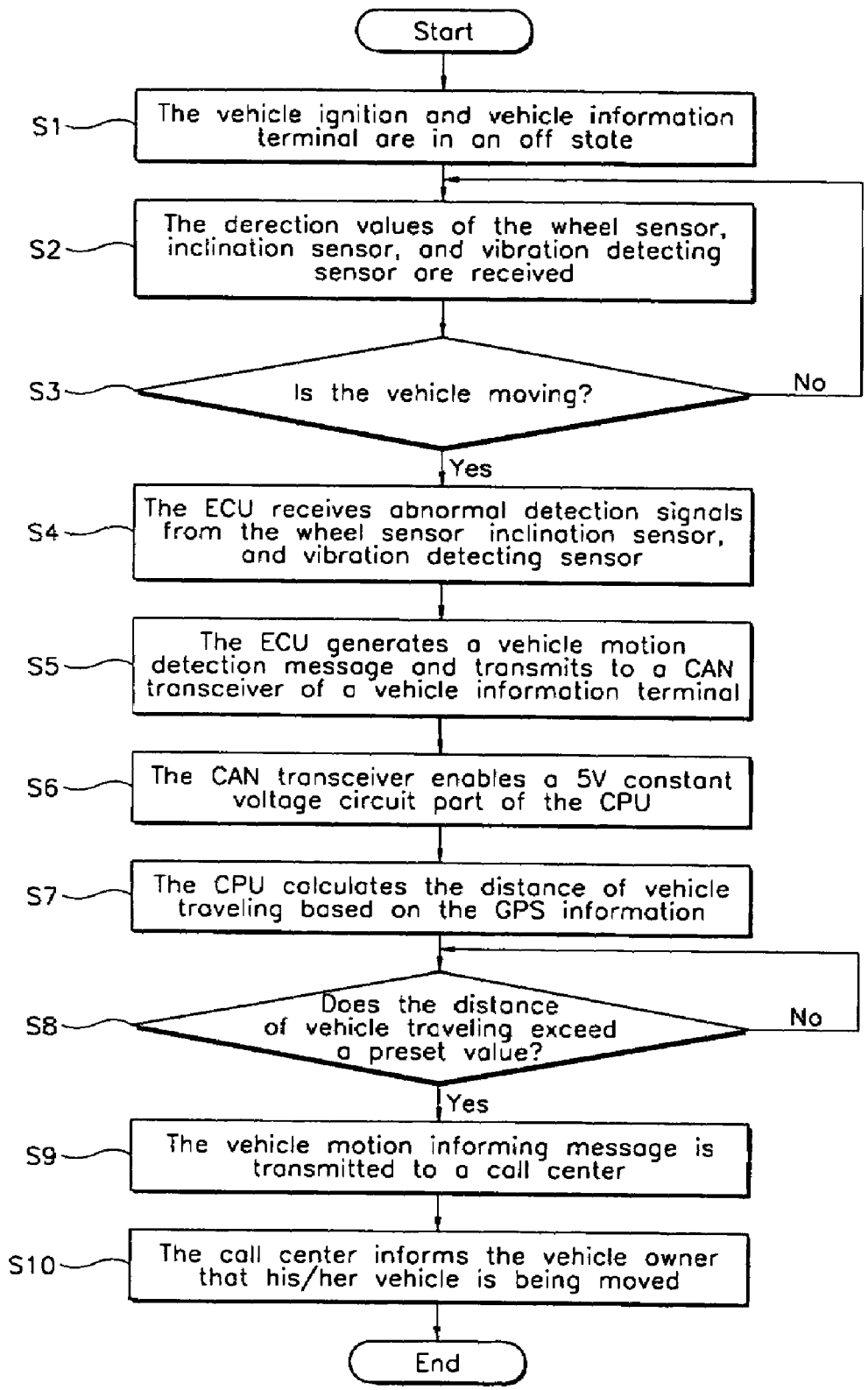

_US 7,176,788 B2_

VEHICLE THEFT PREVENTION SYSTEM AND METHOD THEREOF

CROSS-REFERENCE TO RELATED APPLICATIONS

The present application is based on, and claims priority from, Korean Application Serial Number 10-2004-0064890, filed on Aug. 17, 2004, the disclosure of which is hereby incorporated by reference herein in its entirety.

Field of the Invention

The present invention relates to a vehicle theft prevention system. More particularly, the present invention relates to a system and method of performing a vehicle motion informing function for preventing vehicle theft.

BACKGROUND OF THE INVENTION

Radio communication technology has popularized personal cellular phones, developed car navigation systems and the like. The car navigation system (hereinafter, a vehicle information terminal) displays the present location of the vehicle on an electronic map monitor of a traveling vehicle by receiving a signal from a satellite, calculates the optimal route and guides the user to the intended destination.

The vehicle information terminal functions as a combination of a navigation, Audio and Video (AV) system, which includes an audio tape, CD player, and radio; and wireless telephone by mounting a built-in radio communication module therein.

The vehicle information terminal transmits a vehicle motion informing message to a call center by using a radio communication module if the vehicle is being towed away or burglarized with the ignition turned on.

However, the conventional vehicle information terminal operates the vehicle motion informing function only when the vehicle ignition key is turned on. Thus, when the ignition is turned off, e.g., vehicle is in a parked state, vehicle theft (e.g., being towed or loaded onto a truck) is undetectable.

SUMMARY OF THE INVENTION

Embodiments of the present invention are provided to perform a vehicle motion informing function even when the vehicle ignition key is turned off, thereby effectively preventing vehicle theft.

According to the present invention, a vehicle theft prevention system includes an Electronic Control Unit (ECU) mounted with a controller that generates a vehicle motion detection message by receiving abnormal detection signals from various sensors (detecting the orientation and location of the vehicle) and outputs the message through a Control Area Network (CAN) communication interface. A vehicle information terminal includes a Central Processing Unit (CPU), constant voltage circuit part, and CAN communication interface. The CPU is equipped with a Global Positioning System (GPS) module and mobile communication module. The CPU generates a vehicle motion informing message and outputs the message through the mobile communication module, if the vehicle is determined to be traveling over a predetermined distance based on a GPS location information of the GPS module. The constant voltage circuit element generates a driving power of the CPU by receiving battery power. The CAN communication interface operates the CPU by applying a driving signal into the constant voltage circuit element, if the vehicle motion detection message is transmitted while the vehicle ignition key is turned off.

BRIEF DESCRIPTION OF THE DRAWINGS

For a better understanding of the nature and objects of the present invention, reference should be made to the following detailed description with the accompanying drawings, in which:

FIG. 2 is an operation flowchart of a vehicle theft prevention method according to an embodiment of the present invention.

DETAILED DESCRIPTION OF THE PREFERRED EMBODIMENTS

Figure 1:
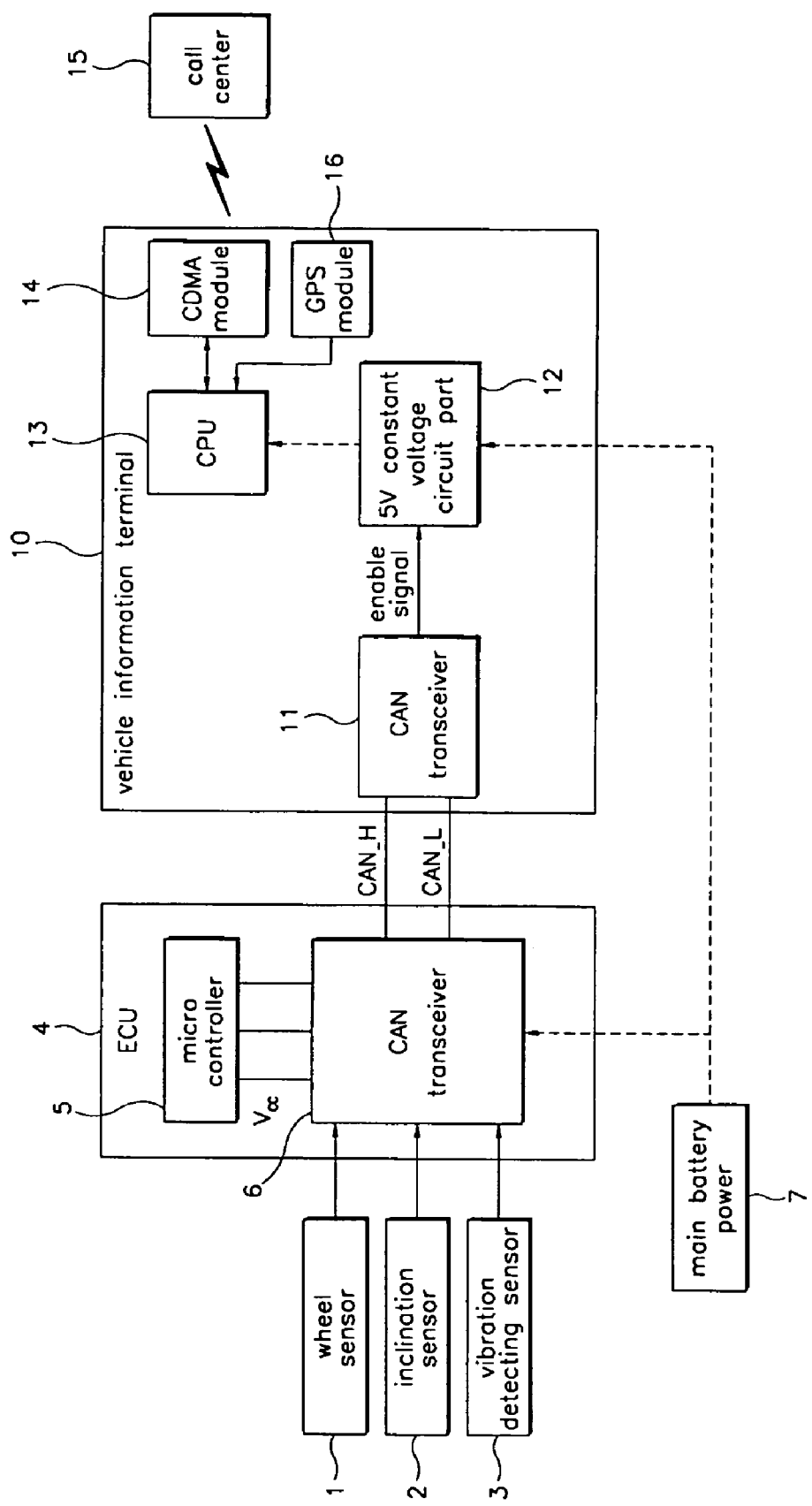
FIG. 1 is a block diagram of a vehicle theft prevention system according to an embodiment of the present invention.

As illustrated in FIG. 1, detection signals of a wheel sensor 1, inclination sensor 2, and vibration detecting sensor 3 (that are operated by battery power when the ignition key is turned off) according to an embodiment of the present invention are inputted into a Control Area Network (CAN) transceiver 6 of an Electronic Control Unit (ECU) 4. The detection signals normally operate a micro controller 5 mounted in the ECU 4. If any or all of the sensors 1, 2, and 3 emit an abnormal signal due to hauling or loading of the vehicle, then the micro controller 5 of the ECU 4 determines that the vehicle is moving and generates a vehicle motion detection message to be transmitted to a CAN transceiver 11 of a vehicle information terminal 10.

In case the vehicle engine stops, the wheel sensor 1, inclination sensor 2, vibration detecting sensor 3 and ECU 4 are assumed to be in operation, powered by the main battery source. If the number of wheel revolutions increases, vehicle body is abnormally sloped or vehicle vibration occurs while the engine stops, then the wheel sensor 1, inclination sensor 2, and/or vibration detecting sensor 3 generate abnormal signals. If any or all of the sensors emit abnormal signals, the ECU 4 determines that the vehicle is being moved or stolen.

The CAN transceiver 6 of the ECU 4 and CAN transceiver 11 of the vehicle information terminal 10 are preferably CAN communication interfaces. The CAN transceiver 11 of the vehicle information terminal 10 typically serves as a Power Management that wakes up a Central Processor Unit (CPU) 13 of the vehicle information terminal 10 to operate the CPU 13. The CAN transceiver 6 in the vehicle terminal is assumed to be provided with the power of a main battery 7 even when the vehicle engine stops.

After receiving a vehicle motion detection message from the ECU 4, the CAN transceiver 11 of the vehicle information terminal 10 outputs an Enable signal to a 5V constant voltage circuit element 12, which generates the power for the CPU 13. The CPU 13 operates normally by receiving the 5V constant voltage.

If the CPU 13 operates normally, the CPU 13 activates a location information calculation logic (not shown) of a Global Positioning System (GPS) module 16 to compute the traveling distance of the vehicle by using the transmitted GPS location information. If the distance of the traveling vehicle is determined to exceed a predetermined value, then the CPU 13 forms a vehicle motion informing message in a Short Message Service (SMS) by using a Code Division Multiple Access (CDMA) module 14, built in the vehicle information terminal 10, and transmits the signal to a call center 15, which handles various vehicle information services.

In the vehicle theft prevention method, it is initially determined that the vehicle ignition is turned off and the vehicle information terminal 10 is in an off state (Step 1). Next, the ECU 4 receives detection values from the wheel sensor 1, inclination sensor 2, and vibration detecting sensor 3 (Step 2). If any or all of the above sensors send abnormal detecting signals, then it is determined whether the vehicle is moving (Step 3). If the vehicle is determined to be moving as a result of step 3, the abnormal detection signals from each sensor are transmitted into the CAN transceiver 6 of the ECU 4 (Step 4). The ECU 4 transmits a vehicle motion detection message to the CAN transceiver 11 of the vehicle information terminal 10 through a CAN bus (Step 5). A CAN controller (not shown) of the CAN transceiver 11 in the vehicle information terminal 10 transmits an enable signal into the 5V constant voltage circuit element 12 (that provides constant voltage for operating the CPU 13) to thereby provide power to the CPU 13 of the vehicle information terminal 10 (Step 6).

The CPU 13 of the vehicle information terminal 10 operates a location information calculation logic based on the GPS location information of the GPS module to calculate the vehicle moving distance (Step 7). Whether the distance of vehicle traveling exceeds a preset value is determined (Step 8). The preset value of the distance may be any suitable distance and in the present embodiment is approximately 300 m. The CPU 13 of the vehicle information terminal 10 converts a vehicle motion informing message in SMS format by using the built-in CDMA module and transmits the message to the call center 15 (Step 9). The call center informs the vehicle owner that his or her vehicle is being moved (Step 10).

The system thus constructed detects vehicle theft by using various sensors (i.e., the inclination sensor and vibration detecting sensor), which generate abnormal signals during a vehicle hauling, loading or the like by detecting the orientation and location of the vehicle and inputs the signals into the ECU. A vehicle motion informing message is transmitted by applying power to the vehicle terminal by using the Power Management of the CAN controller of the CAN transceiver in the vehicle information terminal even when the vehicle ignition is turned off. Thus, the vehicle can cope with vehicle theft even when the vehicle ignition is turned off.

As apparent from the foregoing, there is an advantage at least in that the vehicle motion informing function is executed to prevent vehicle theft even when the vehicle ignition is turned off.

What is claimed is:

1. A vehicle theft prevention system comprising:
    an electronic control unit provided with a controller that generates a vehicle motion detection message by receiving abnormal detection signals from various sensors detecting the orientation and location of the vehicle and outputs the vehicle motion detection message through a control area network communication interface; and
    a vehicle information terminal including:
    a central processing unit equipped with a global positioning system module and a mobile communication module, said central processing system generating a vehicle motion informing message to be outputted through said mobile communication module, if the vehicle is determined to have traveled over a predetermined distance based on a global positioning system location information of said global positioning system module;
    a constant voltage circuit element that generates a driving power of said central positioning system by receiving a battery power supply; and
    a control area network communication interface that operates said central processing system by applying a driving signal into said constant voltage circuit element, if the vehicle motion detection message is received through a control area network communication while the vehicle ignition key is turned off.

2. The system as defined in claim 1, wherein said control area network communication interface is provided with a control area network controller that activates and deactivates said constant voltage circuit element.

3. A vehicle theft prevention method in a system including a global positioning system module, a mobile communication module, and a controller, which operates a vehicle motion informing function by using the global positioning system module and the mobile communication module during the detection of vehicle theft, comprising:
    an electronic control unit receives detection values from various sensors, which detect the orientation and location of the vehicle when the vehicle ignition key is turned off;
    the electronic control unit generates a vehicle motion detection message and transmits said message to the controller, if abnormal detection signals are detected from the various sensors;
    a communication interface receives the vehicle motion detection message transmitted from the electronic control unit;
    the communication interface operates the controller by a constant voltage circuit element that is applied with a driving signal and generates a driving power of the controller;
    the controller computes the traveling distance of the vehicle based on a global positioning system location information of the global positioning system module; and
    the controller generates a vehicle motion informing message and transmits the message through the mobile communication module, if the traveling distance of the vehicle exceeds a predetermined value.

4. The method as defined in claim 3, wherein said vehicle motion detection message is transmitted and received through the control area network communication interface.

* * * * *